United States Patent
Gong

(10) Patent No.: US 8,417,638 B2
(45) Date of Patent: *Apr. 9, 2013

(54) MULTIPLE PARTY ON-LINE TRANSACTIONS

(75) Inventor: Yitao Gong, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,770

(22) Filed: Feb. 16, 2012

(65) Prior Publication Data

US 2012/0150684 A1   Jun. 14, 2012

Related U.S. Application Data

(63) Continuation of application No. 11/956,075, filed on Dec. 13, 2007, now Pat. No. 8,145,569.

(51) Int. Cl.
*G06Q 40/00* (2012.01)
(52) U.S. Cl. .................................. 705/44; 705/38
(58) Field of Classification Search .................. 705/44, 705/38
See application file for complete search history.

(56) References Cited

U.S. PATENT DOCUMENTS

| | | | |
|---|---|---|---|
| 5,987,132 A | 11/1999 | Rowney | |
| 6,868,393 B1 | 3/2005 | Demsky et al. | |
| 7,433,845 B1 | 10/2008 | Flitcroft et al. | |
| 7,647,247 B2 | 1/2010 | Abraham et al. | |
| 2005/0065881 A1 | 3/2005 | Li et al. | |
| 2007/0299736 A1 | 12/2007 | Perrochon et al. | |
| 2008/0015988 A1 | 1/2008 | Brown et al. | |
| 2009/0150266 A1 | 6/2009 | Dickelman | |
| 2009/0204510 A1 | 8/2009 | Hwang | |

OTHER PUBLICATIONS

Fields, B., Office Action issued in co-pending U.S. Appl. No. 11/956,075, filed Dec. 13, 2007, pp. 1-12, Jun. 15, 2009.
Fields, B,. Office Action issued in co-pending U.S. Appl. No. 11/956,075, filed Dec. 13, 2007, pp. 1-10, Jun. 1, 2010.
Fields, B., Office Action issued in co-pending U.S. Appl. No. 11/956,075, filed Dec. 13, 2007, pp. 1-12, Feb. 16, 2011.
Fields, B., Office Action issued in co-pending U.S. Appl. No. 11/956,075, filed Dec. 13, 2007, pp. 1-11, Jan. 12, 2009.
Fields, B., Final Office Action issued in co-pending U.S. Appl. No. 11/956,075, filed Dec. 13, 2007, pp. 1-12, Jan. 8, 2010.
U.S. Appl. No. 13/271,284 filed Oct. 12, 2011.
U.S. Appl. No. 11/956,075 filed Dec. 13, 2007.

*Primary Examiner* — Thomas Dixon
*Assistant Examiner* — Benjamin S Fields
(74) *Attorney, Agent, or Firm* — Johnson, Marcou & Isaacs, LLC

(57) ABSTRACT

A role associated with one or more parties involved with a purchase transaction is received. A routing rule associated with the purchase transaction is also received, the routing rule defining how the purchase transaction is routed among the one or more parties. The purchase transaction is processed based on the role of each party and the routing rule.

20 Claims, 10 Drawing Sheets

MULTIPLE PARTY ON-LINE TRANSACTIONS

CROSS-REFERENCE TO RELATED APPLICATIONS

This application is a continuation application of and claims priority to, pending U.S. application Ser. No. 11/956,075, filed on Dec. 13, 2007, entitled "MULTIPLE PARTY ON-LINE TRANSACTIONS." The disclosure of the foregoing application is incorporated herein by reference in its entirety.

TECHNICAL FIELD

This document relates generally to information management.

BACKGROUND

In the past sales at on-line retailers have surpassed the totals of the year before. Computer users have become more and more comfortable reviewing products on the internet and having them delivered via mail order. Often, such purchases are paid for using credit cards. Such an approach may be convenient, such as when buying a large item from an established retailer. Other transactions lend themselves more toward on-line payment processing systems (which themselves may involve credit card companies or by other mechanisms). For example, transactions may be paid for through open payment systems such as Google Checkout or PayPal, such as when the person providing the product or service (the merchant or vendor) does not accept credit cards; or the buyer doesn't want to provide credit card information directly to the merchant or vendor due to lack of trust; or the buyer doesn't want to create an account at each different merchant or vendor. Other types of purchases may also be carried out using such payment systems.

More than one party can be associated with a purchase transaction. For example, a manager may be required to approve a purchase transaction of an item that a salesperson wishes to purchase. In this case, the manager may have to purchase the item himself because the manager may not be capable of approving the purchase if the salesperson places the order.

SUMMARY

In general, one aspect of the subject matter described in this specification can be embodied in methods, systems and computer program products. One method includes the actions of receiving a role associated with one or more parties involved with a purchase transaction, receiving a routing rule associated with the purchase transaction, the routing rule defining how the purchase transaction is routed among the one or more parties, and processing the purchase transaction based on the role of each party and the routing rule.

Another aspect of the subject matter described in this specification can be embodied in methods that include the actions of identifying one or more parties associated with a purchase transaction in a virtual shopping cart; identifying one or more rules associated with the purchase transaction and a role associated with each of the one or more parties; determining whether to route the shopping cart to the one or more parties based on the one or more rules and the role associated with each of the one or more parties, and processing the shopping cart based on the determination.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
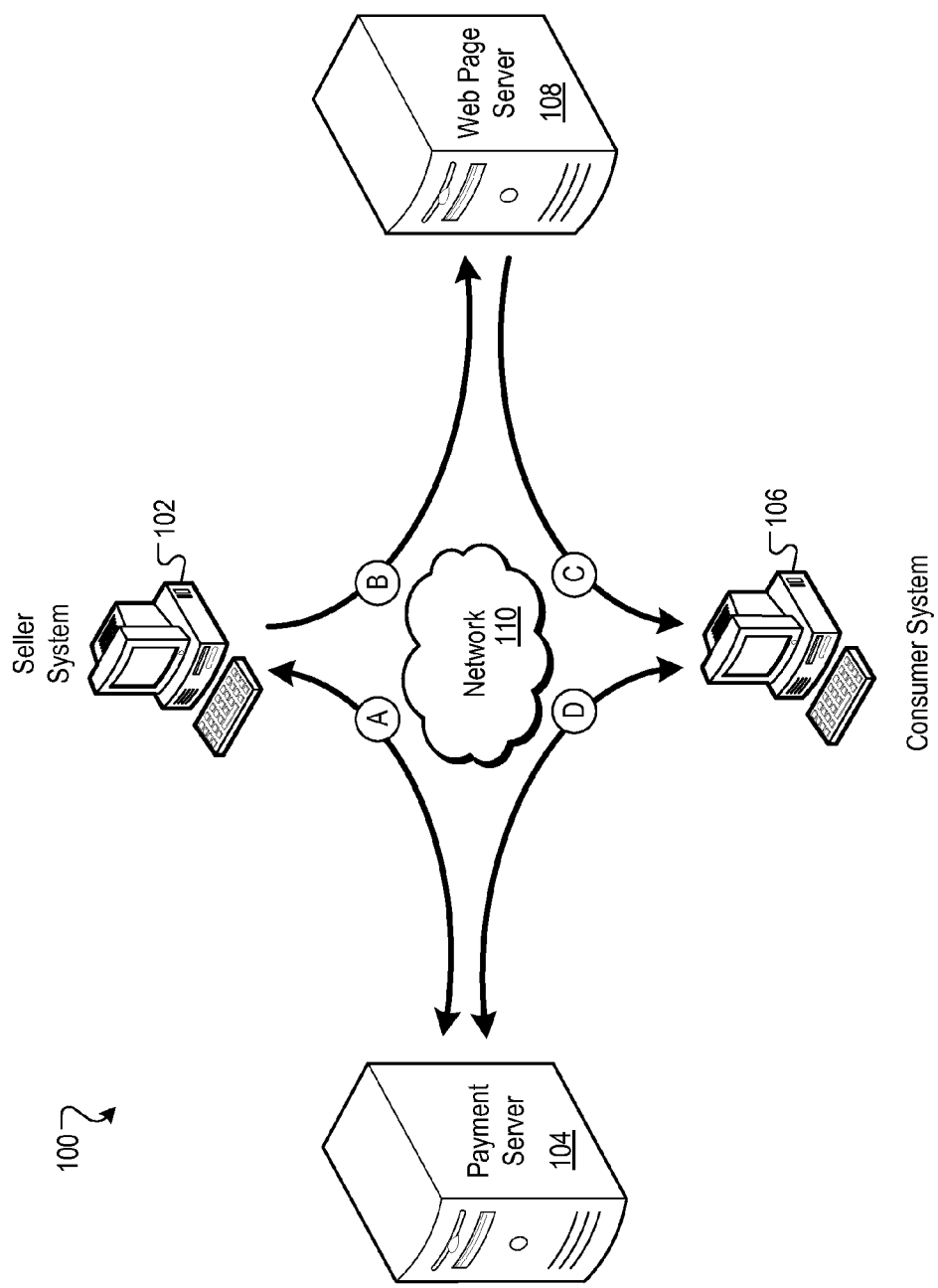
FIG. 1 is a conceptual flow diagram of an example transaction processing system.

FIG. 1 is a conceptual flow diagram of an example payment processing system 100. In general, the system 100 includes various computers 102-108 (which may each be a single computer or a group of many computers such as an entire server farm or data center) that can communicate through a network 110 such as the internet. The computers include a seller system 102, such as that operated by a vendor who sets up and operates an on-line ecommerce web site. While reference is made to various computers 102-108, other forms of electronic devices including mobile communication devices, set-top devices, telephony devices, portable devices and the like are possible.

The seller system 102 may create a web page and, as shown by Arrow A, register the seller with a payment server such as payment server 104. The seller may identify himself and herself, and may open an account into which payments from buyers may be placed. In addition, the seller may optionally also open and populate an inventory database for goods to be offered for sale by the seller. The seller in particular may identify names and descriptions for items to be sold (which may include goods or services), along with prices for the items.

As part of the registration process or at a later time, the payment server 104 may generate and provide mark-up code to the seller system (Arrow A) so that the seller can cut-and-paste the code into the seller's web page. The mark-up code may include HTML, XHTML code, or other forms of code for producing the display of a purchasing control, such as an "add to cart" button that causes payment server 104 to record that a visitor to the web site wants to add a particular item associated with the control to his or her cart.

As shown by Arrow B, the seller system 102 may then upload the completed web page to a web page server 108, which may be, for example, a server or servers at an internet service provider (ISP) with which the seller has a relationship, or may also be a server or servers owned and operated by the seller.

At a later time, a user of a consumer system 106 may navigate to the seller's web page, such as by entering a search term for "hand-made jewelry" (which would be routed through a search server, not shown), and selecting a link for the relevant site from the provided search results. The user may navigate through the jewelry site and be provided with various web pages for the site, as shown by Arrow C.

At some point during this browsing process, the user sees something he or she likes either for himself/herself, for someone else, or even for a business transaction, and clicks on a control to purchase the item (e.g., add the item to his or her shopping cart). The control may be, for example, one of the controls generated by code provided by the payment server 104 via Arrow A. Selection of the control may direct the user's browser to obtain information from payment server 104 relating to a shopping cart to be associated with the consumer system 106. For example, as shown by Arrow D, the user may transmit information identifying his or her system and the control, and the payment server 104 may use the information to determine the identity of the vendor, the item selected, and the amount of the item, so as to update a shopping cart for the consumer system 106. Alternatively, the information sent by the consumer system 106 may include information identifying the vendor and the item and price, or the payment server 104 may acquire such information from the web page server 108 or another source using identifying information submitted from the consumer system 106.

Once the payment server 104 has updated a shopping cart for the consumer system 106 in its own records, it may pass information reflecting the updated shopping cart back to the consumer system 106 (e.g., number of items in the cart and total dollar value of items in the cart), such as via XML messaging, so that the consumer system 106 can display the cart to the user. The transmission of the information may occur in a manner other than generating an entirely new web page for the consumer system 106, so that the user need not have a new and separate browser window opened or have their browser redirected to a site associated with the payment server 104. The display of the new information may occur in the same window or tab as the web page, such as by using an iframe or other similar structure. In general, the interaction with the payment server 104 may occur in the background, unnoticed by the user.

Further interaction between consumer system 106 and payment server 104 may occur in a similar manner or via redirection of an entire browser pane to the payment server 104. For example, the user may continue to browse the vendor web page for additional items (as indicated by Arrow C) and may have those items added to a shopping cart in a similar manner. In addition, the user may browse to other vendor web sites and may add items from those sites to their cart in a similar manner (e.g., by selecting controls that those other vendors have obtained from payment server 104, and that allow payment server 104 to identify the particular items to be sold and the vendors of the items). Additional activity may occur via redirection, such as if the user chooses to checkout and purchase all the items in his or her cart, as described above, and such action will involve additional transmissions as indicated by Arrow D.

In some implementations, a user can decide to involve more than one party in a purchase transaction. For example, a user may need to get someone's permission before purchasing an item. In another example, a party may have to approve of the purchase for other reasons such as budget or the other party is the one that will be paying for the item in the purchase transaction (e.g., for example child needing authorization from parent to purchase an item).

Figure 2:
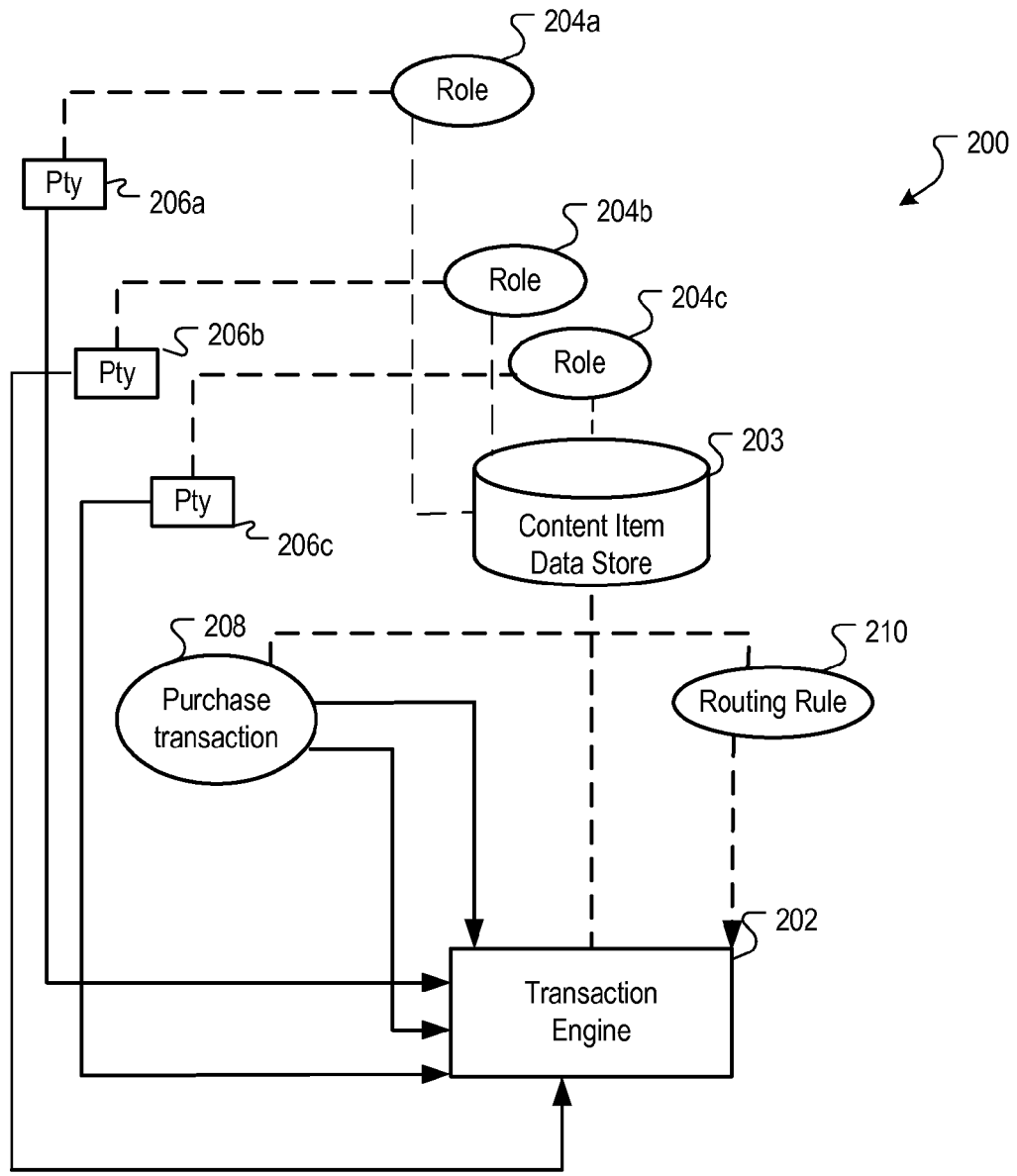
FIG. 2 is a block diagram of an example transaction processing system for processing a purchase transaction involving multiple parties.

FIG. 2 is a block diagram of an example transaction processing system 200 for processing a purchase transaction involving multiple parties. The transaction processing system 200 can, for example, be implemented in the seller system 102 or the consumer system 106 utilizing one or more computing devices that include memory devices storing processing instructions and processing devices for executing the processing instructions. An example computing system is shown and described with reference to FIG. 8. Other implementations, however, can also be used.

The system 200 can allow for multiple parties to be involved in a purchase transaction. For example, when a user purchases an item online using an on-line ecommerce website, the system 200 can route the purchase transaction to one or more parties based on one or more roles associated with the party. The purchase transaction can then be processed based on the roles and the parties.

In one implementation, the transaction engine 202 can receive a role 204 associated with one or more parties 206. The role 204 can define the responsibility of each party 206 with regard to the purchase transaction 208. Each of the parties 206 can, for example, participate in the purchase transaction 208 before the purchase transaction 208 is processed for payment. The parties 206 can participate in the purchase transaction 208 based on the role 204 of each party 206.

The role 204 can, for example, define the responsibility of each party 206. The role 204 can for example, include any one of an approver, a buyer (or purchaser), a receiver, a suggestor or other roles. An approver can, for example, include any party that is in charge of approving the purchase transaction 208. For example, a manager may have to approve a purchase transaction 208 of his or her employee. A buyer can, for example, include any party that is in charge of paying for the purchase transaction 208. For example, a manager can be in charge of paying for the purchase transaction 208 of an employee. A receiver can, for example, include any party that receives the item or items in the purchase transaction 208. For example, a gift can be purchased for a friend, and the friend can be indicated as the recipient, or receiver, of the purchase transaction 208. A suggestor can be any party that makes a suggestion to purchase a good or service, such as to a buyer.

In one implementation, each party 206 can be associated with one or more roles 204. For example, the same party 206 can be in charge of both approving the purchase transaction 208 and receiving the items in the purchase transaction 208. In other implementations, each role 204 can be associated with more than one responsibility. For example, an approver can be a party 206 that can approve of the purchase transaction 208 as well as pay for the purchase transaction 208. In some implementations, the purchaser is the party that defines the roles and responsibilities. The roles 204 and responsibilities, can for example, be defined after the purchaser has decided on the items to include in the purchase transaction 208.

In one implementation, the transaction engine 202 can receive a time frame associated with each role 204. The time frame can include an amount of time that the party 206 is associated with the specific role 204. The amount of time can be in the form of minutes, hours, days, weeks, years, etc. The amount of time can also be in the form of number of transactions. For example, a party 206 can be assigned the role 204 of approver for a day, month, or year. In another example, a party 206 can be assigned the role 204 of recipient for one purchase transaction 208.

In one implementation, the transaction engine 202 can receive a routing rule 210 associated with the purchase transaction 208. The routing rule 210 can, for example, define how the purchase transaction 208 is routed among the one or more parties 206. The routing rule 210 can define each party 206 and the role 204 of each party 206 as well as the responsibility of each party 206 based on the role 204. The routing rule 210 can, for example, specify which of the parties 206 receives the purchase transaction 208 first. The routing rule 210 can also specify which of the parties 206 must approve the purchase transaction 208 before the purchase transaction 208 can be processed for payment. The routing rule 210 can also specify the party that is responsible for paying for the purchase transaction 208.

In one implementation, the routing rule 210 can be received from any of the parties associated with the purchase transaction 208. For example, the routing rule 210 can be received from a buyer, or purchaser, of the purchase transaction 208. For example, the party 206 that has to approve the purchase transaction 208 before the purchase transaction 208 is processed can be the party 206 that determines how the other parties 206 interact with the purchase transaction 208.

In one implementation, the transaction engine 202 can process the purchase transaction 208 based on the role 204 of each of the parties 206 and the routing rule 210. The transaction engine 202 can, for example, send a shopping cart associated with the purchase transaction 208 to the one or more parties 206 based on the specified role 204 of each party and the routing rule 210. For example, the routing rule 210 can specify that a certain party 206 must receive the purchase transaction 208 to enter credit card information to be able to pay for the transaction 208 prior to the purchase transaction 208 being processed for payment.

In one implementation, each of the parties 206 specified by the routing rule 210 can be required approve of the purchase transaction 208 prior to the purchase transaction 208 being processed. An approval can, for example, include different forms. Approving the purchase transaction 208 can depend on the role 204 of each party 206. An approval can, for example, include setting a flag associated with the purchase transaction 208.

In one implementation, the routing rule 210 can define a budget for the purchase transaction 208. For example, the party 206 that defines the routing rule can define a budget that the purchase transaction 208 cannot exceed. If the budget is exceeded by the purchase transaction 208, then the routing rule 210 can require a party 206 to approve of the purchase transaction 208 prior to the purchase transaction 208 being processed for payment.

In one implementation, a group of buyers may purchase several items together. In this case, one buyer can select some items or contribute portion of payments, or both. In this case, multiple parties may assume the same role. For example, more than one party can be a buyer.

In one implementation, the routing rule 210 can define a category. The approver in this example has to approve of the purchase transaction unless the purchase transaction is associated with the category. For example, if the routing rule 210 is associated with the category "books," if the purchase transaction does not include books, then the approver must approve of the purchase transaction.

Figure 3:
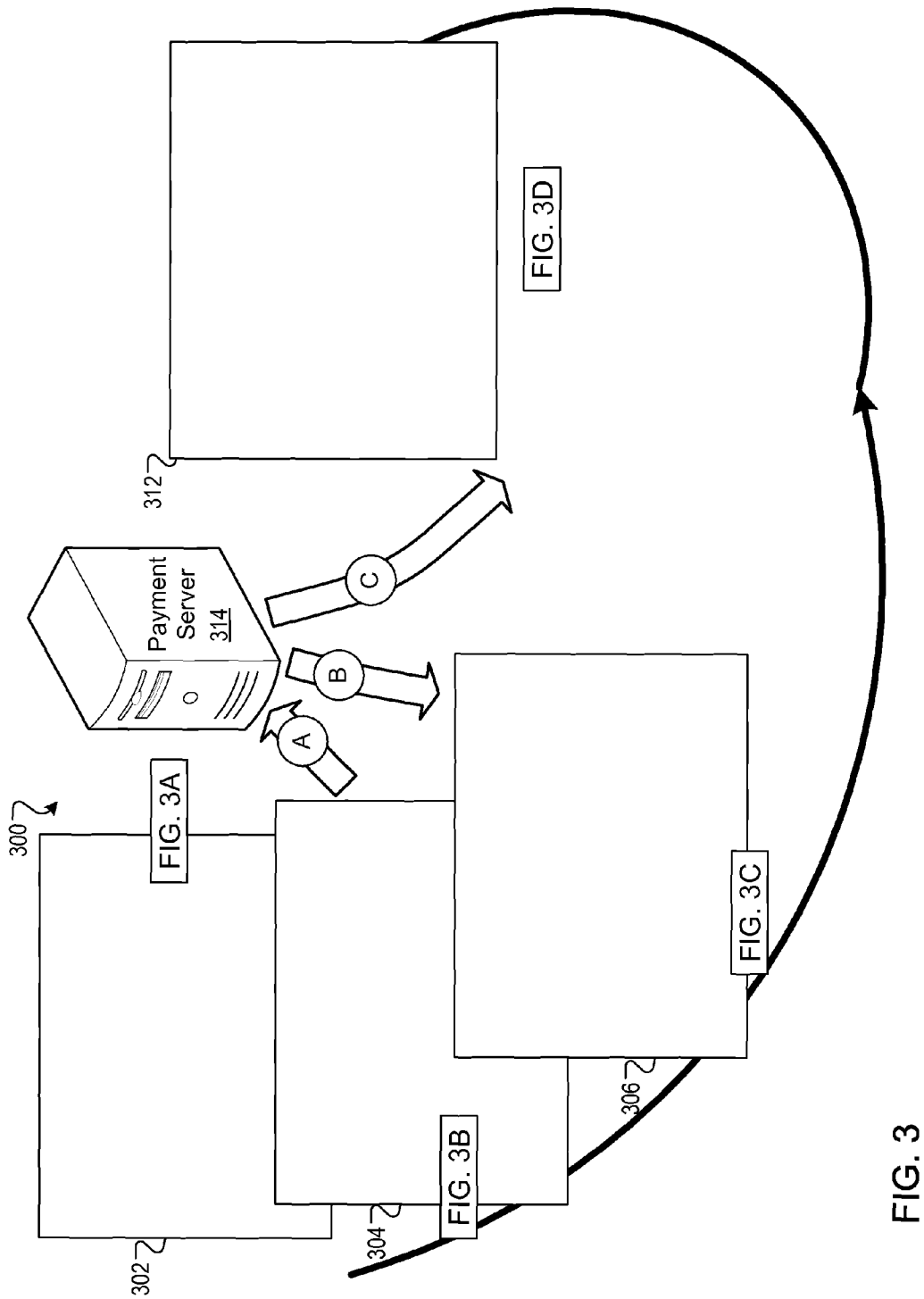
FIG. 3 shows a graphical conceptual flow diagram of an example process for processing a purchase transaction.
Figure 3A:
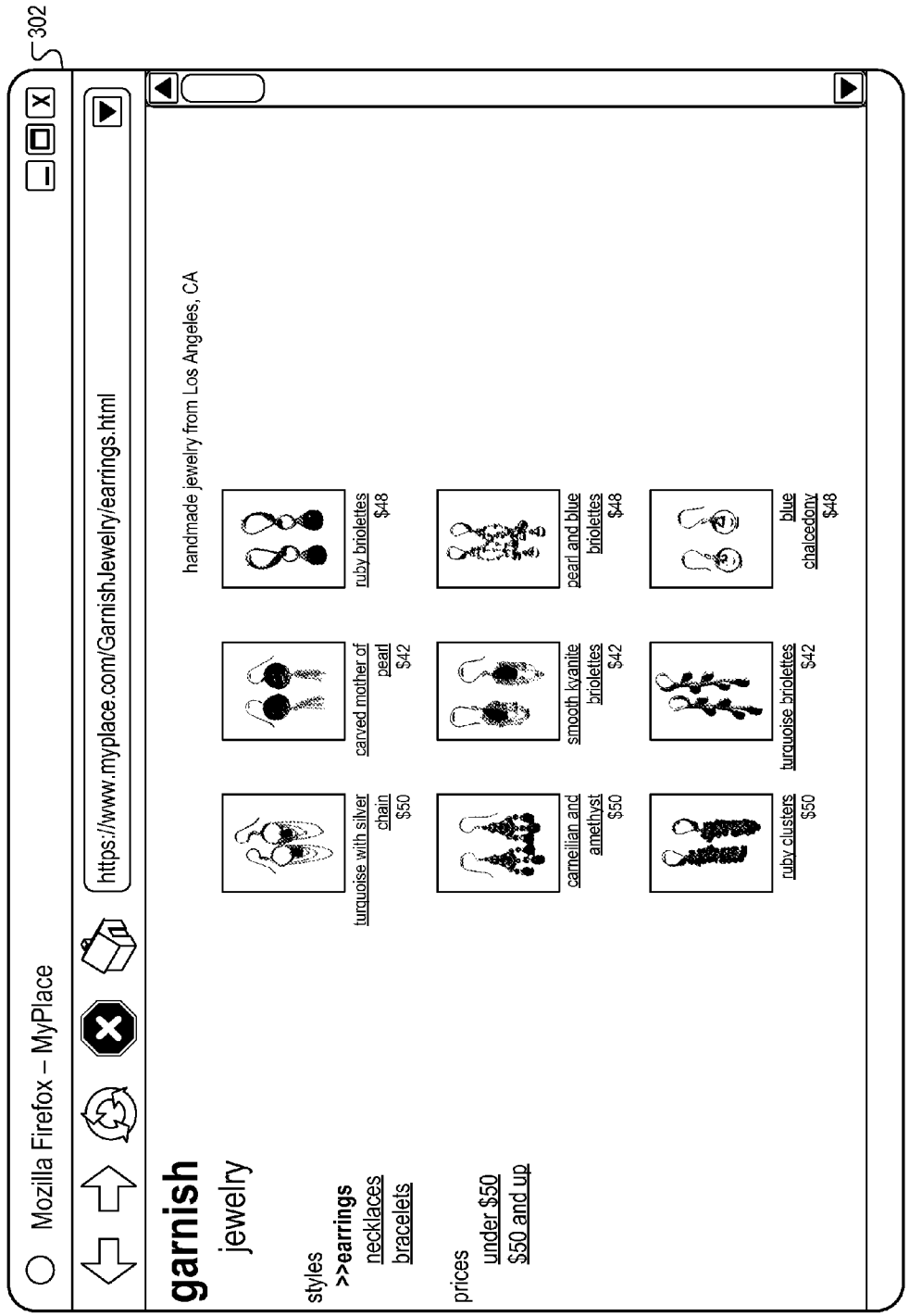
FIGS. 3A-3D show example screen shots associated with the conceptual flow diagram of FIG. 3.
Figure 3B:
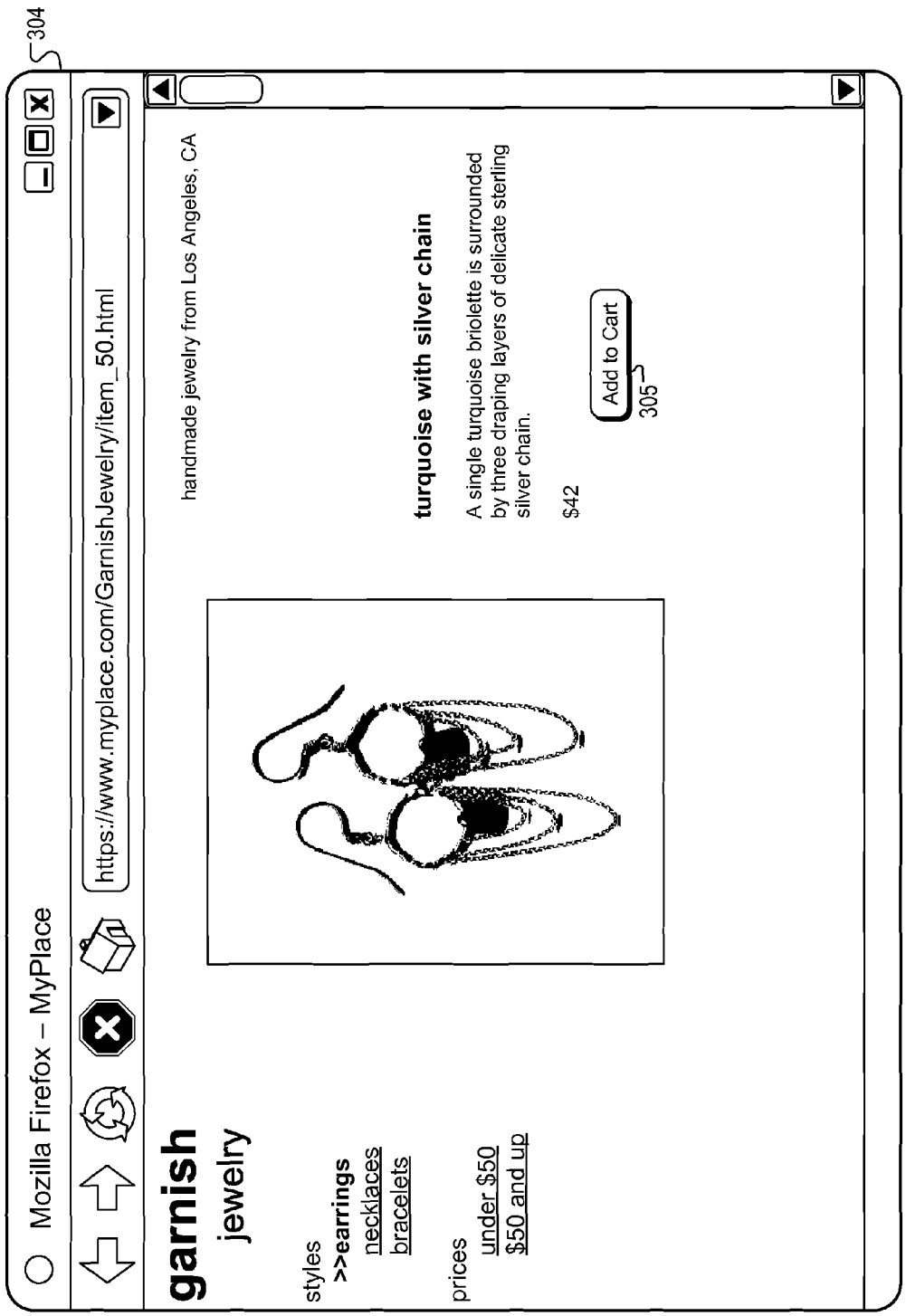

FIG. 3 shows a graphical conceptual flow diagram of an example process for processing a purchase transaction. FIGS. 3A-3D show example screen shots associated with the conceptual flow diagram of FIG. 3. The process shows an example for user interaction with an on-line payment system, such as Google Checkout, involving purchasing a piece of jewelry from a web site operated by a jewelry maker. The purchaser is purchasing the earrings for a friend as a gift, and needs the approval of her mother before purchasing the item because the mother is going to be paying for the items. In general, the process and the screen shots illustrate the steps a purchaser would take, and the screens the purchaser would see, when buying several pieces of jewelry in a transaction involving multiple parties. Of particular interest, the various components of an on-line payment system are visually integrated with the vendor's own web site so the purchaser can see the progress of their shopping as they go along, much as they would in an integrated purchasing environment, where the vendor itself takes care of payment processing.

Display 302 shows a general page from a vendor's web site. The display 302, for a vendor called Garnish Jewelry, shows a number of high-quality, handcrafted jewelry pieces (see FIG. 3A). Display 304 shows a screen from the purchaser selecting one of the pieces of jewelry—a pair or earrings with silver chains—from display 302. General web page content is shown in the display 104, with navigational menu controls in the form of selectable hyperlinks to the left, an image of the product for sale, a description of the product, and a price for the product (see FIG. 3B). In addition, display 304 shows a selectable control in the form of an "add to cart" button 305 that a purchaser may select to purchase a unit of the product—here a pair of earrings. Selection of the button 305 may cause an HTTP request, in the form of an XMLHttpRequest (XHR), to be made of payment server 314, as indicated by Arrow A.

The payment server 314 may then parse the HTTP request to obtain an identifier for the purchaser, and also to identify the vendor and relevant payment parameters. The identity of the purchaser may be determined, in one implementation, from a session ID. The purchaser may be positively identified, for example, if the purchaser has previously logged into a system associated with the payment server 314 (such as through a general Google log in) or using a cookie. The purchaser may also be identified by their device without immediate identification of the purchaser, such as by a session ID that can later be associated with a user ID in the system when the purchaser logs in to the payment processing system.

When the purchaser and vendor have been identified and the balance of the purchaser's shopping cart incremented, the changes may be passed back to the client device of the purchaser, as shown by Arrow B. The transmission of information may occur, for example, by XML transmission formatted in a manner compatible with the code running on the client device. As one example, the payment server may pass information reflecting a description of the selected item(s), their quantity, their price, and a total price of goods in the purchaser's shopping cart.

Figure 3C:
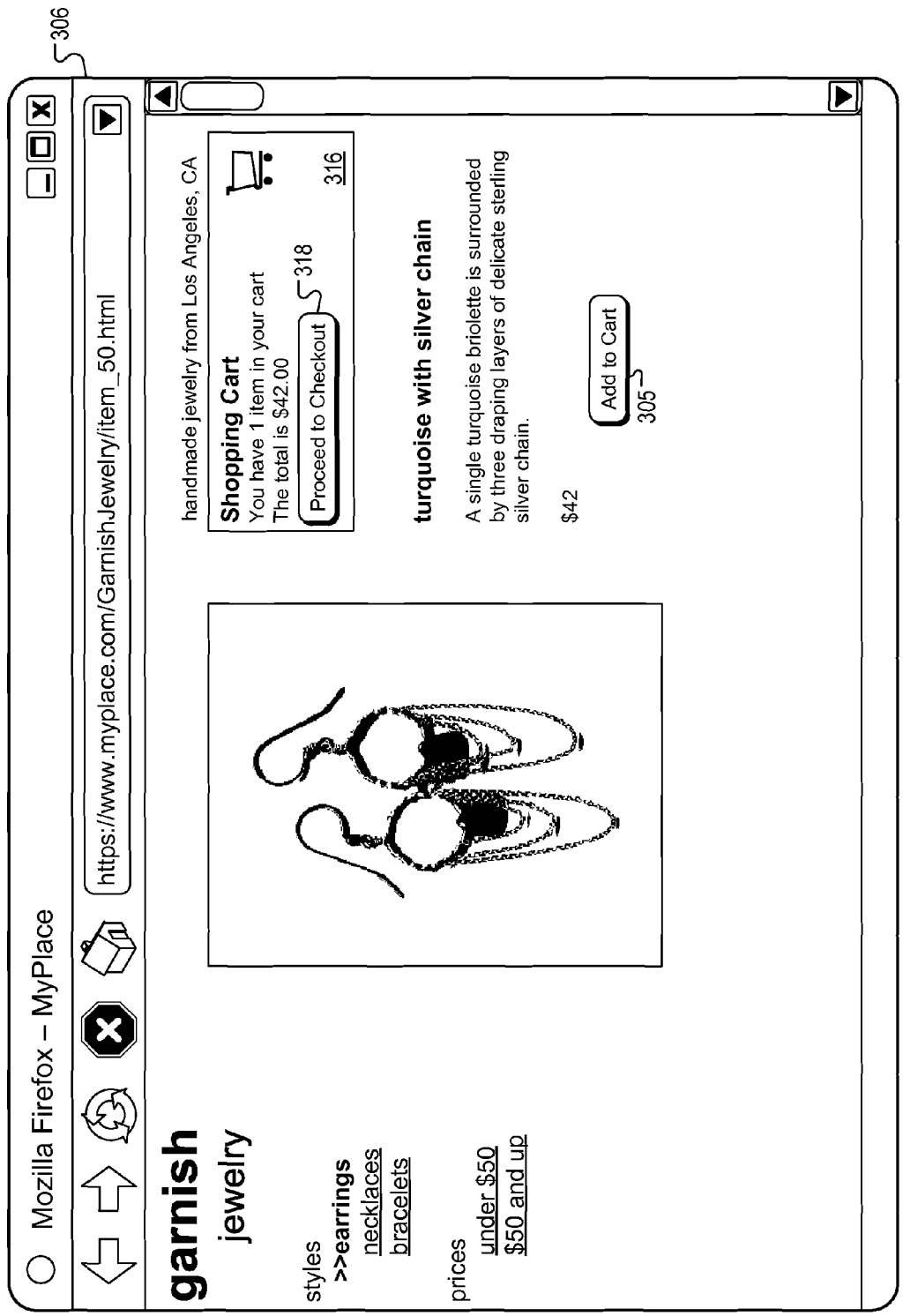
Figure 3D:
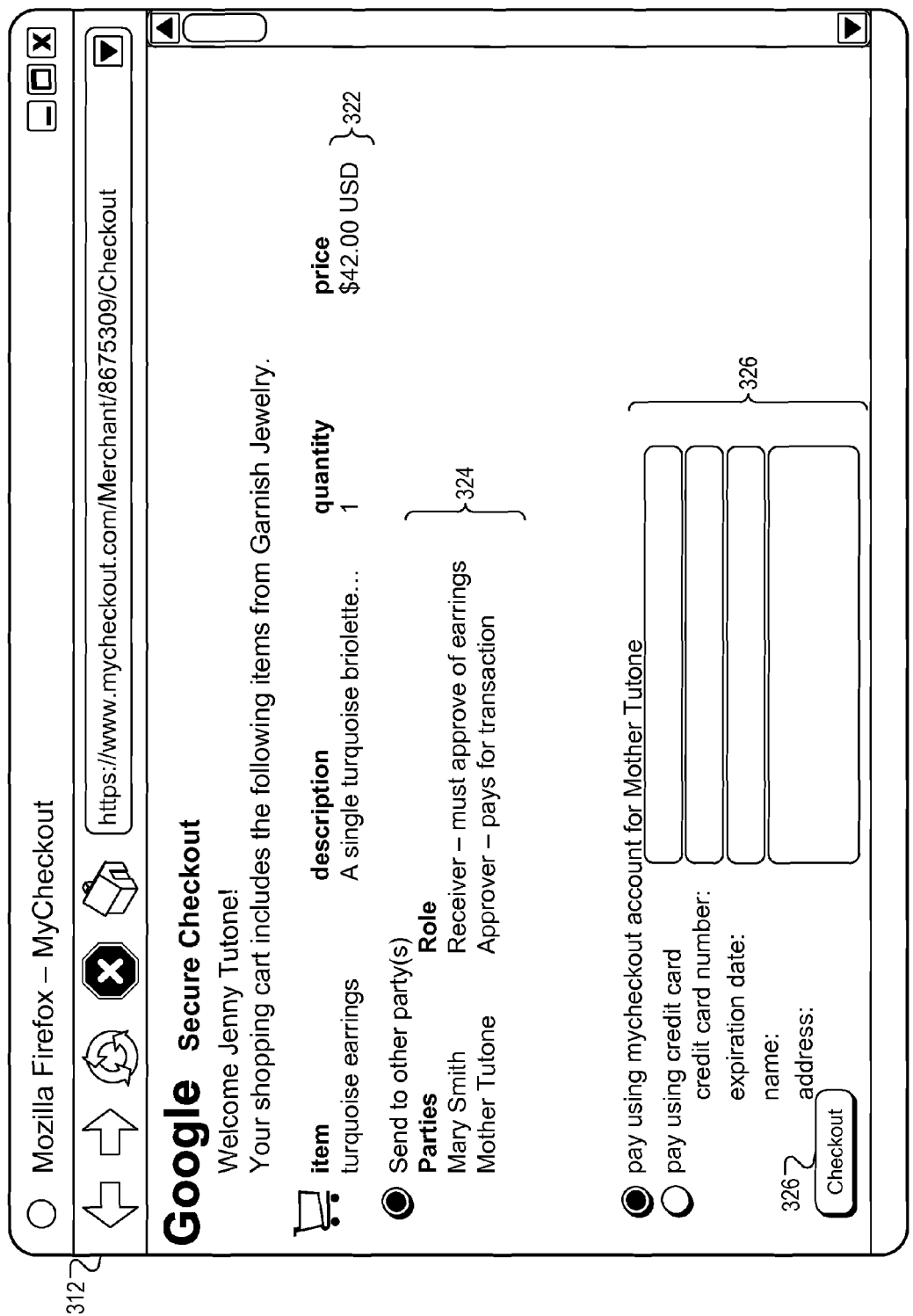

Display 306 shows the result of a user's selection of button 305 (see FIG. 3C). The purchaser may also choose to go to a checkout to pay or otherwise edit entries in his or her shopping cart, by selecting the "proceed to checkout" control button 318. Such a selection may finally take the purchaser away from the vendor's underlying page, and to the payment processor's page (although the checkout may also be performed in the same content window of a browser as the vendor's web site, by mechanisms similar to those described above). This option is described in more detail with respect to FIG. 3D.

At display 312, the user/purchaser has selected a "proceed to checkout" button, and is redirected to a web page operated by the payment server 314. To generate this page, the payment server 314 may check its database fields that have been updated through the purchaser's selection of "add to cart" buttons. At this point, the interaction with the user may occur according to various mechanisms to permit closing out of the transaction. For example, the user may be shown a list of items and their prices 322 that have been selected by the user. The user may then select items to delete or may increase or otherwise change the quantities of items. Such changes will be reflected in associated databases managed by the payment processor.

The user can also specify a routing rule 324. The user can select one or more parties and the role associated with each party. For example, the user can select Mary Smith as the receiver of the transaction and Mary Smith, as the receiver, must approve of the earrings in the shopping cart, and she can also provide the shipping address. The user can also select Mother Tutone as the approver of the transaction and the approver must pay for the transaction.

The shopping cart can then be routed to the other parties as specified in the routing rule 324. For example, the shopping cart can be sent, for example, via email to the other parties according to the routing rule. Therefore, in this example, the shopping cart can be first sent to Mary Smith. Mary Smith can, for example, receive a link to the purchase transaction as an email. She can open up the link and be able to view the same display 312. As one of the other parties, she may be positively identified, for example, if she had previously logged into a system associated with the payment server 314 or using a cookie. She may also be identified by the device without immediate identification of the purchaser, such as by a session ID that can later be associated with a user ID in the system when the purchaser logs in to the payment processing system.

She may be presented with the display 312 with an additional area that allows her to perform her responsibility according to her role. In this example, she can be presented with an option of approving or declining the purchase of the earrings based on whether or not she likes the earrings. If she approves of the purchase, she can then provide the shipping address, and the shopping cart is then routed to the next party Mother Tutone. Mother Tutone can be identified in the same manner as the other parties. While reference is made to a serial process, one or more steps of the process can be performed in parallel.

The user associated with paying for the transaction, in this example, Mother Tutone, may also be permitted to select a payment method, such as through a Google Checkout account or a debit or credit card or other payment mechanism 326. The payment server 314 may also store a preferred payment method for the user and use that method (or present it as a default) if the user does not select another. Finally, the user may confirm that the displayed information is accurate and may cause the transaction to be completed by selecting checkout button 326.

When the person in charge of paying for the transaction chooses to complete the purchase, their account is debited by the payment server 314 in an amount equal to the price of all the goods in the shopping cart plus tax, shipping/handling, and other costs, such as a transaction charge for the payment processor (assuming all other approvals have been received). In a like manner, an account for the vendor may be credited, and the creditor may be notified of the transaction, with shipping information for the purchaser. The vendor may have previously selected a preferred method for being informed of transactions, such as by e-mail for a small vendor and via XML messaging or updating of a database that is accessible to the vendor (e.g., as stored in Google Base). In addition, the vendor and purchaser, in registering with the system, may have agreed to be contractually bound to make agreed-upon payments and/or deliveries of goods, so as to help ensure that transactions will be carried out successfully. The vendor may receive information such as the identity and quantity of goods sold, the amount of the transaction, and a shipping address for the purchaser so that the vendor can ship the goods.

Figure 4:
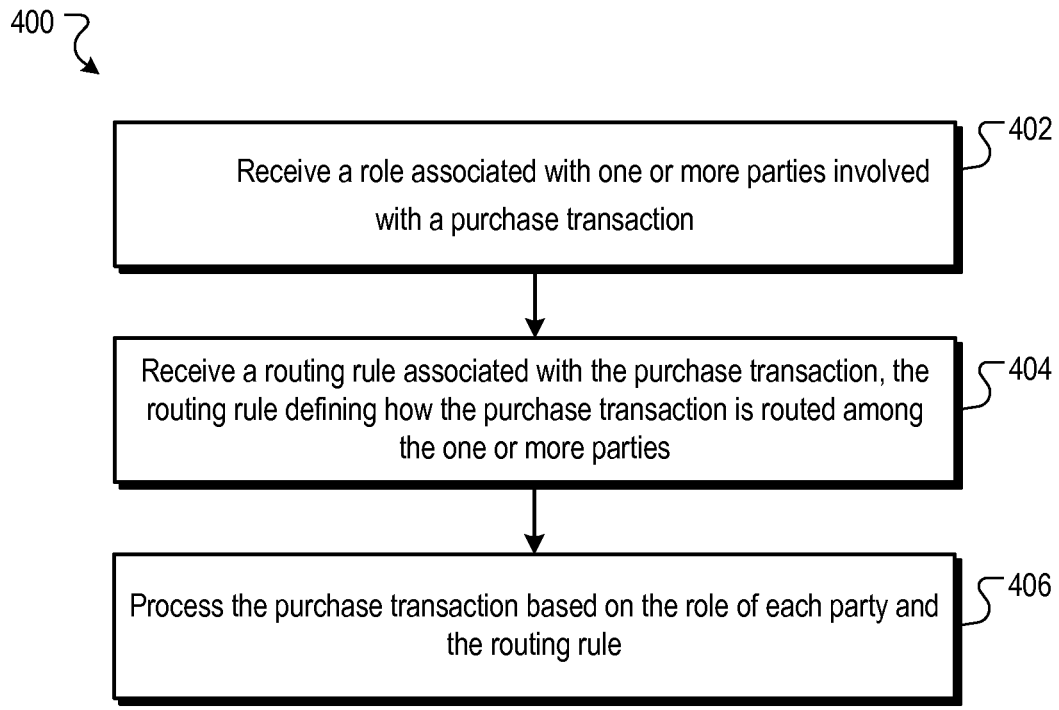
FIG. 4 is a flow diagram of an example process for receiving information associated with a purchase transaction.

FIG. 4 is a flow diagram of an example process 400 for receiving information associated with a transaction. The process 400 can, for example, be implemented in a system such as the transaction system 200 of FIG. 2.

Stage 402 receives a role associated with one or more parties involved with a purchase transaction. For example, the transaction engine 202 can receive a role associated with one or more parties involved with a purchase transaction.

Stage 404 receives a routing rule associated with the purchase transaction, the routing rule defining how the purchase transaction is routed among the one or more parties. For example, the transaction engine 102 can receive a routing rule associated with the purchase transaction, the routing rule defining how the purchase transaction is routed among the one or more parties.

Stage 406 processes the purchase transaction based on the role of each party and the routing rule. For example, the transaction engine 202 can process the purchase transaction based on the role of each party and the routing rule.

Figure 5:
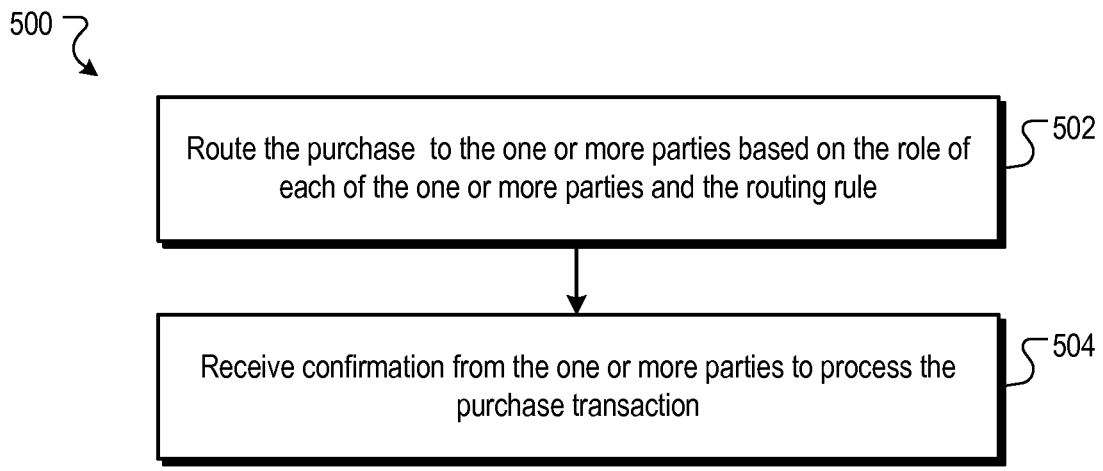
FIG. 5 is a flow chart of an example process for processing a purchase transaction.

FIG. 5 is a flow diagram of an example process 500 for processing a purchase transaction. The process 500 can, for example, be implemented in a system such as the transaction system 200 of FIG. 2.

Stage 502 routes the purchase transaction to the one or more parties based on the role of each of the one or more parties and a routing rule. For example, the transaction engine 202 can route the purchase transaction to the one or more parties based on the role of each of the one or more parties and the routing rule.

Stage 504 receives confirmation from the one or more parties to process the purchase transaction. For example, the transaction engine 202 can receive confirmation from the one or more parties to process the purchase transaction.

Figure 6:
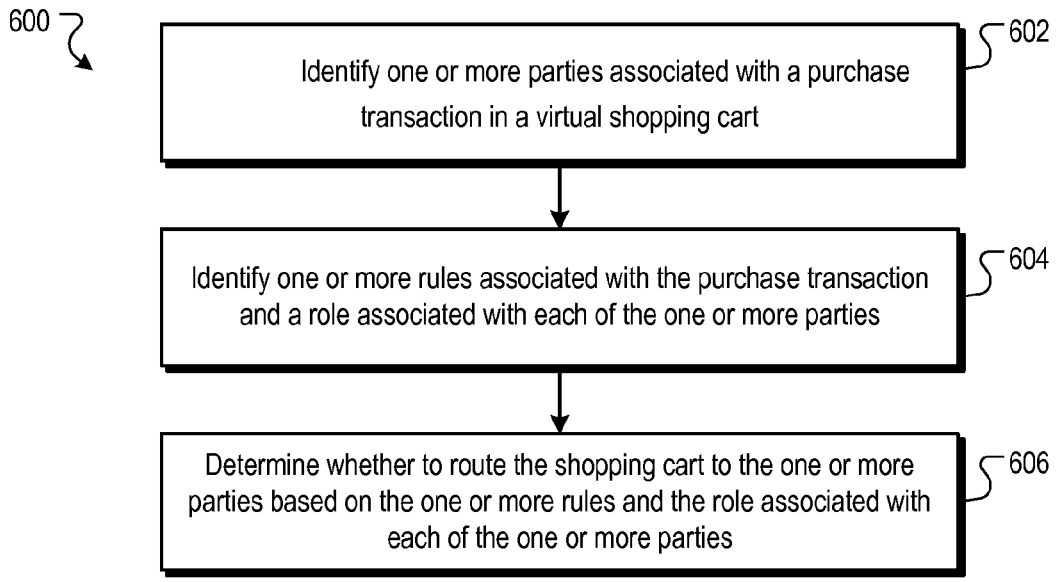
FIG. 6 is a flow chart of another example process for receiving information associated with a purchase transaction.

FIG. 6 is a flow chart of another example process for receiving information associated with a purchase transaction. The process 600 can, for example, be implemented in a system such as the transaction system 200 of FIG. 2.

Stage 602 identifies one or more parties associated with a purchase transaction in a virtual shopping cart. For example, the transaction engine 202 can identify one or more parties associated with a purchase transaction in a virtual shopping cart.

Stage 604 identifies one or more rules associated with the purchase transaction and a role associated with each of the one or more parties. For example, the transaction engine 202 can identify one or more rules associated with the purchase transaction and a role associated with each of the one or more parties.

Stage 606 determines whether to route the shopping cart to the one or more parties based on the one or more rules and the role associated with each of the one or more parties. For example, the transaction engine 202 can determine whether to route the shopping cart to the one or more parties based on the one or more rules and the role associated with each of the one or more parties.

Figure 7:
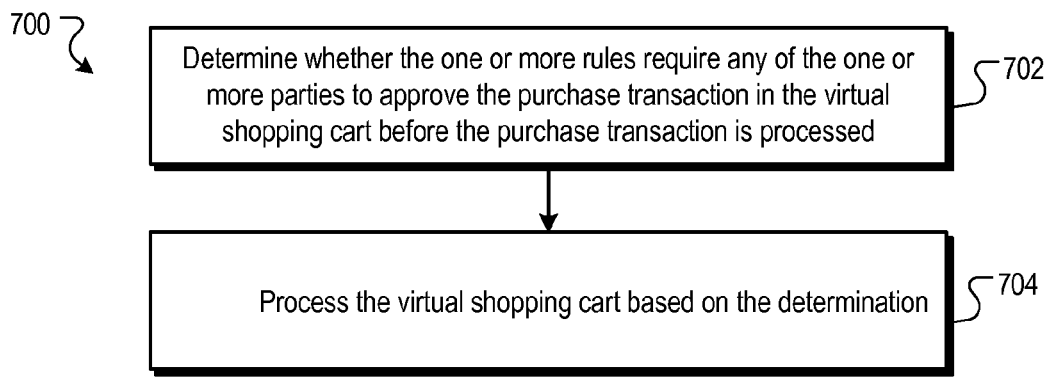
FIG. 7 is a flow chart showing an example processing of an on-line payment transaction.

FIG. 7 is a flow chart of an example process for determining whether to route a shopping cart. The process 700 can, for example, be implemented in a system such as the transaction system 200 of FIG. 2.

Stage 702 determines whether the one or more rules require any of one or more parties to approve the purchase transaction in the virtual shopping cart before the purchase transaction is processed. For example, the transaction engine 202 can determine whether the one or more rules require any of the one or more parties to approve the purchase transaction in the virtual shopping cart before the purchase transaction is processed.

Stage 704 processes the virtual shopping cart based on the determination. For example, the transaction engine 202 can process the virtual shopping cart based on the determination.

Figure 8:
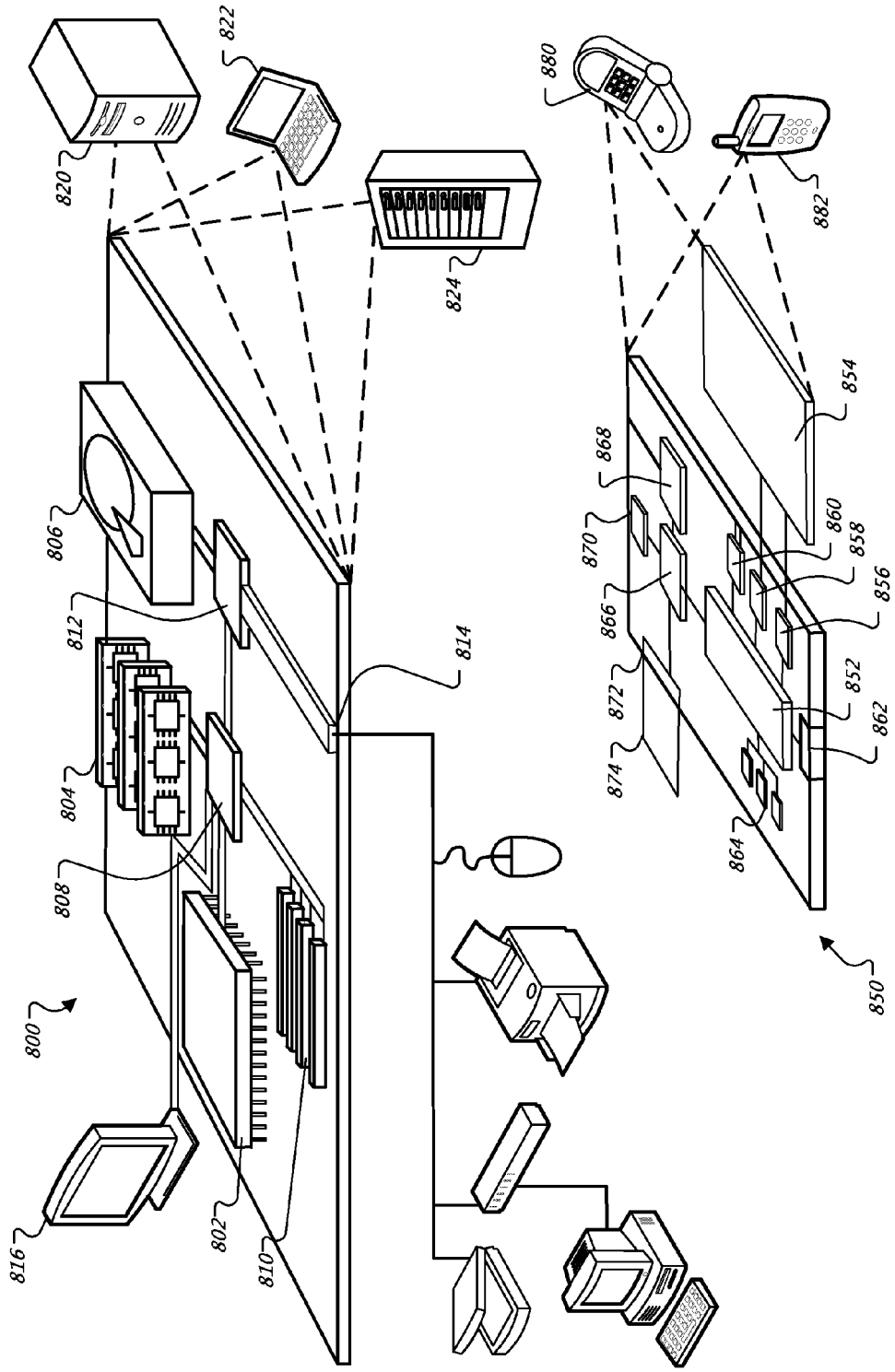
FIG. 8 shows an example of a generic computing device and a generic mobile device.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the payment systems and methods have been described, it should be recognized that numerous other applications are contemplated. Moreover, although many of the embodiments have been described in relation to a so-called shopping cart, that term should be understood to include various forms of mechanisms for presenting an organized grouping of items or servers that a user has selected for possible purchase, and can include such descriptions as shopping baskets and the like. Accordingly, other embodiments are within the scope of the following claims.

What is claimed is:

1. A computer-implemented method, comprising:
    receiving a role associated with one or more parties involved with a purchase transaction;
    receiving a routing rule associated with the purchase transaction, the routing rule defining how the purchase transaction is routed among the one or more parties; and
    processing the purchase transaction based on the role of each party and the routing rule.

2. The method of claim 1, where the role is one of an approver, a buyer, a receiver, and a suggestor.

3. The method of claim 1, where the role defines a responsibility of each party for approving the purchase.

4. The method of claim 1, further comprising:
    receiving a time period associated with the role.

5. The method of claim 4, where the period is one of a one-time transaction associated with the role or a pre-defined period associated with the role.

6. The method of claim 5, further comprising:
determining whether the time period has expired; and
canceling the purchase transaction based on the determination.

7. The method of claim 1, where each of the one or more parties participates in the purchase transaction before the purchase transaction is processed based on the role of each of the one or more parties.

8. The method of claim 2, where receiving a routing rule associated with the purchase transaction, the routing rule defining how the purchase transaction is routed among the one or more parties comprises:
receiving the routing rule from the approver.

9. The method of claim 1, where processing the purchase transaction based on the role and the routing rule comprises:
routing the purchase transaction to the one or more parties based on the role of each of the one or more parties and the routing rule; and
receiving confirmation from the one or more parties to process the purchase transaction.

10. The method of claim 2, where the routing rule defines a budget for the purchase transaction, where if the budget is exceeded by the purchase transaction, the approver must approve the purchase transaction prior to the purchase transaction being processed.

11. The method of claim 2, where the routing rule defines a category, where the approver must approve the purchase transaction unless the purchase transaction is associated with the category.

12. A computer-implemented method, comprising:
identifying one or more parties associated with a purchase transaction in a virtual shopping cart;
identifying one or more rules associated with the purchase transaction and a role associated with each of the one or more parties; and
determining whether to route the shopping cart to the one or more parties based on the one or more rules and the role associated with each of the one or more parties.

13. The method of claim 12, where the role is one of an approver, a buyer, a receiver, and a suggestor.

14. The method of claim 13, further comprising:
receiving an identifier associated with the one or more parties and the one or more rules from the approver associated with the purchase transaction.

15. The method of claim 12, where the role defines a responsibility of each of the one or more parties for approving the purchase transaction.

16. The method of claim 12, further comprising:
receiving a period associated with each role, where the period is one of a one-time transaction associated with the role or a pre-defined period associated with the role.

17. The method of claim 12, where determining whether to route the shopping cart to the one or more parties based on the one or more rules and the role associated with each of the one or more parties comprises:
determining whether the one or more rules require any of the one or more parties to approve the purchase transaction in the virtual shopping cart before the purchase transaction is processed; and
processing the virtual shopping cart based on the determination.

18. A system, comprising:
a transaction engine operable to:
identify one or more parties associated with a purchase transaction in a virtual shopping cart;
identify one or more rules associated with the purchase transaction and a role associated with each of the one or more parties;
determine whether to route the shopping cart to the one or more parties based on the one or more rules and the role associated with each of the one or more parties; and
process the shopping cart based on the determination.

19. The system of claim 18, where the role is one of an approver, a buyer, a receiver, and a suggestor.

20. The system of claim 19, where the transaction engine:
receives an identifier associated with the one or more parties and the one or more rules from the approver associated with the purchase transaction.

\* \* \* \* \*